United States Patent [19]

Ono

[11] Patent Number: 5,001,410

[45] Date of Patent: Mar. 19, 1991

[54] DRIVING SYSTEM FOR STEPPING MOTOR

[75] Inventor: Takeshi Ono, Yokohama, Japan

[73] Assignee: Canon Kabushiki Kaisha, Tokyo, Japan

[21] Appl. No.: 372,621

[22] Filed: Jun. 28, 1989

[30] Foreign Application Priority Data

Jul. 1, 1988 [JP] Japan .................................. 63-162609

[51] Int. Cl.5 ............................................... H02P 8/00
[52] U.S. Cl. ..................... 318/696; 318/685; 358/409
[58] Field of Search .................. 318/696, 685; 358/409

[56] References Cited

U.S. PATENT DOCUMENTS

| | | | |
|---|---|---|---|
| 4,145,643 | 3/1979 | Maeda et al. ......................... | 318/696 |
| 4,149,196 | 4/1979 | Wada et al. .......................... | 358/409 |
| 4,602,882 | 7/1986 | Akazawa et al. ................. | 318/696 X |
| 4,642,544 | 2/1987 | Furumura et al. ................... | 318/696 |

Primary Examiner—William M. Shoop, Jr.
Assistant Examiner—Saul M. Bergmann
Attorney, Agent, or Firm—Fitzpatrick, Cella, Harper & Scinto

[57] ABSTRACT

A driving system for driving a stepping motor to which the number of driving steps and a driving trigger are input to rotate the stepping motor by a half step so as to follow a one-two phase energization sequence. The system energizes one phase of the motor by a driving mode command to position a rotor, and the motor is then rotated by starting energization from two phases next to the one phase already energized.

4 Claims, 5 Drawing Sheets

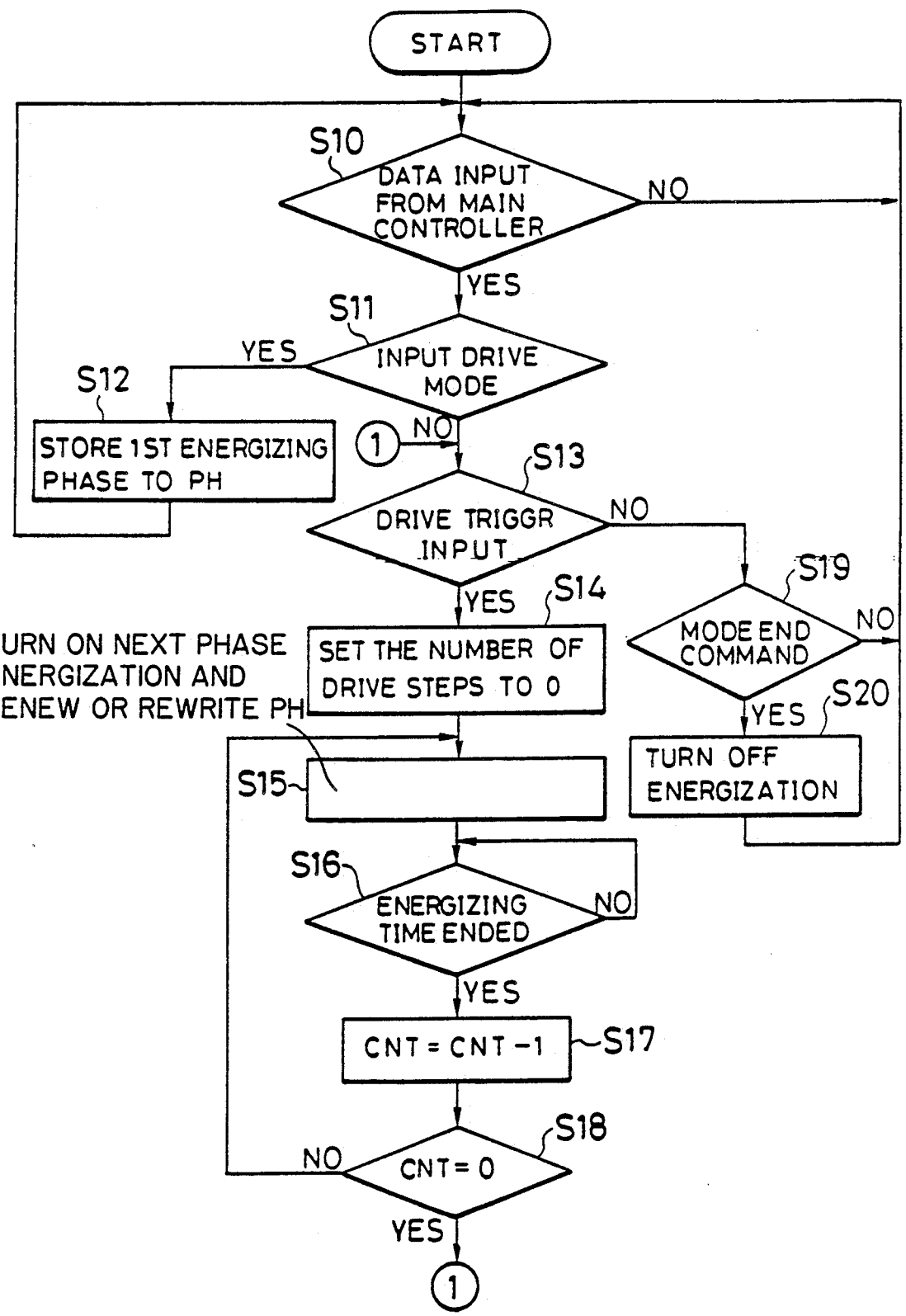

DRIVING SYSTEM FOR STEPPING MOTOR

BACKGROUND OF THE INVENTION

1. Field of the Invention

The present invention relates to a driving system for a stepping motor, and more particularly, it relates to a stepping motor driving system suitable to rotate the stepping motor such as a stepping motor for feeding recording paper and/or original in facsimile and the like, by a predetermined steps with uneven cycles.

2. Related Background Art

Generally, in a facsimile and the like, upon transmission, an original is read along a main scanning direction per one scanning line by means of a one line image sensor fixed to the facsimile while feeding the original in an auxiliary direction perpendicular to the main scanning direction. And, upon reception, an image is recorded along a direction perpendicular to a feeding direction of a recording paper per one scanning line by means of a one line recording head fixed to the facsimile while feeding the recording paper. Since the feeding of the original and/or recording paper must be effected with high accuracy and the original must be intermittently scanned in the facsimile system, a stepping motor is generally used for feeding the original and recording paper. As a method for energizing coils of such stepping motor, one-phase-on drive (1-phase energization drive), two-phase-on drive (2-phase energization drive) or half-step drive (1-2 phase energization drive) has been already known; however, because of its ability to provide fine control and high maximum operating frequency, the half-step drive (1-2 phase energization drive) has been adopted to drive the stepping motor for feeding the paper in the facsimile system. It is also known that recording and reading density can be varied in the auxiliary direction during recording and reading operations in facsimile systems, (in the auxiliary direction) by providing a super fine mode of 15.4 line/mm, a fine mode of a 7.7 line/mm or reference a mode of 3.85 line/mm. If the amount of feeding in each auxiliary scanning line at the super fine mode (15.4 line/mm) corresponds to one step of a 1-2 phase energization (half-step drive) for a stepping motor, when the recording paper is fed in the auxiliary direction with one line by the 1-2 phase energization (half-step drive) at other modes, the stepping motor must be rotated by a plurality of steps. Further, the stepping motor should be rotated by a plurality of steps per each motor driving trigger also when the recording paper is cut at each page.

When the stepping motor is rotated by a plurality of steps, it is not reasonably determined whether the first or initial driving of the stepping motor should be started from one phase or two phases, since the present position of phases of the stepping motor differs or varies in accordance with the previous number of steps by which the stepping motor was rotated.

For this reason, in the past, a technique has been proposed according to which energization controls are successively effected in a predetermined order by selecting the order of energizations to reduce noise in consideration of the kind of the driving. Such techniques is disclosed in Japanese Patent Application Laid-Open No. 60-82097.

However, fact whether the driving of the stepping motor at the 1-2 phase energization is started from the one phase or two phases depends upon not only noise but also on other factors.

Explaining with more detail, FIG. 1A shows a step response of a stepping motor in a condition that energization of two phases is changed to energization of one phase at the 2-1 phase-on drive of the motor, and FIG. 1B shows a step response of the motor in a condition that energization of one phase is changed to energization of two phases at the 1-2 phase energization drive (half-step drive) of the motor. FIG. 1A shows the relation between rotation of the rotor of the motor and to residual vibration when the motor is rotated by one step by energization of one phase from a condition by which the stepping motor having a minimum stepping angle of 3.75° was held at energization of two phases. Similarly, FIG. 1B shows the relation between rotation of the rotor of the same rotor and its residual vibration when the motor, which was held at energization of one phase, is changed to energization of two phases. In these Figures, the abscissa indicates time (t) and the ordinate indicates angle of rotation of the rotor (deg). Incidentally, here, it is assumed that a value of winding current per phase flowing at each phase energization is constant.

As apparent from FIGS. 1A and 1B, when the driving of the motor is started from energization of one phase as shown in FIG. 1A, although the building-up of the motor is slower and it takes a longer time to start the rotation of the motor, the amplitude of residual vibration is smaller and the duration of such vibration will also be shorter, than in the case the drive is started from energization of two phases. The delay in the building-up of the motor will be more notable when the motor is stopped or when the motor damping in the reverse direction is great. In order to hasten or quicken the building-up of the motor at energization of one phase, larger energy (energization current) is required. On the other hand, when the driving of the motor is started from energization of two phases (FIG. 1B), although the building-up of the motor is faster, the amplitude of the residual vibration will be greater and the duration of such vibration will also be longer.

For these reasons, if it is desired to apply enough energization current to the motor build up the motor by energization of one phase as shown in FIG. 1A, start energy for the rotation of the motor will be excessive relative to when the motor is built up at the energization of two phases as shown in FIG. 1B. Thus, a problem that arises in vibration noise and motor damping occur.

SUMMARY OF THE INVENTION

An object of the present invention is to solve the above-mentioned problem and to smoothly rotate a stepping motor with reduced residual vibration and reduced vibration noise by initiating the rotation of the motor always at energization of one phase for each motor driving trigger.

Other object of the present invention will be apparent from the following detailed description regarding embodiments of the present invention.

BRIEF DESCRIPTION OF THE DRAWINGS

FIG. 6 is a motor drive flow chart of a controller of the motor controlling circuit of FIG. 2.

DESCRIPTION OF THE PREFERRED EMBODIMENTS

The present invention will now be explained in connection with embodiments thereof with reference to the accompanying drawings.

Figure 1A:
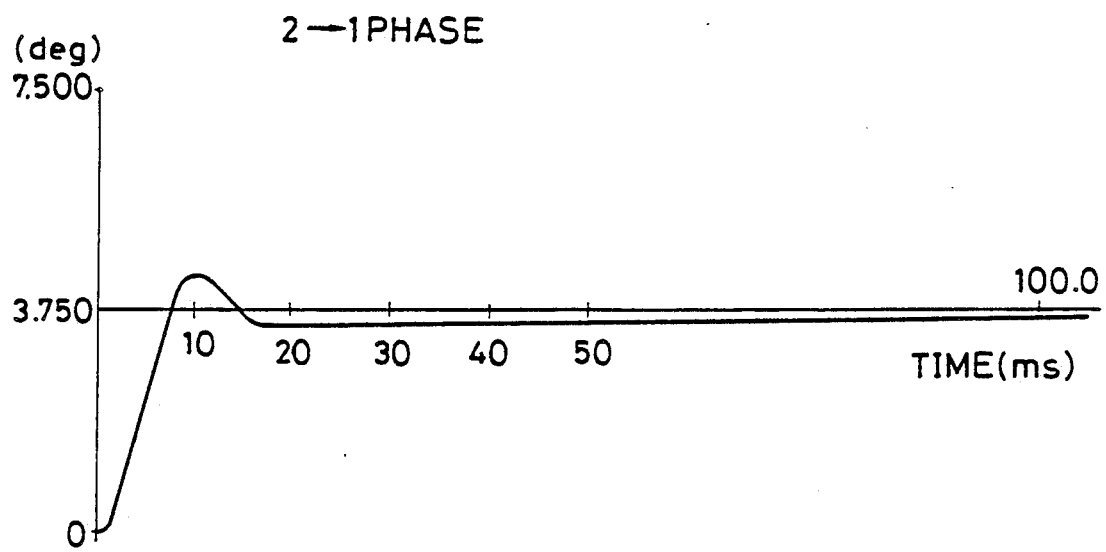
FIG. 1A is a graph showing a step response of a stepping motor upon energization of one phase at 2-1 phase energization drive (half-step drive)
Figure 1B:
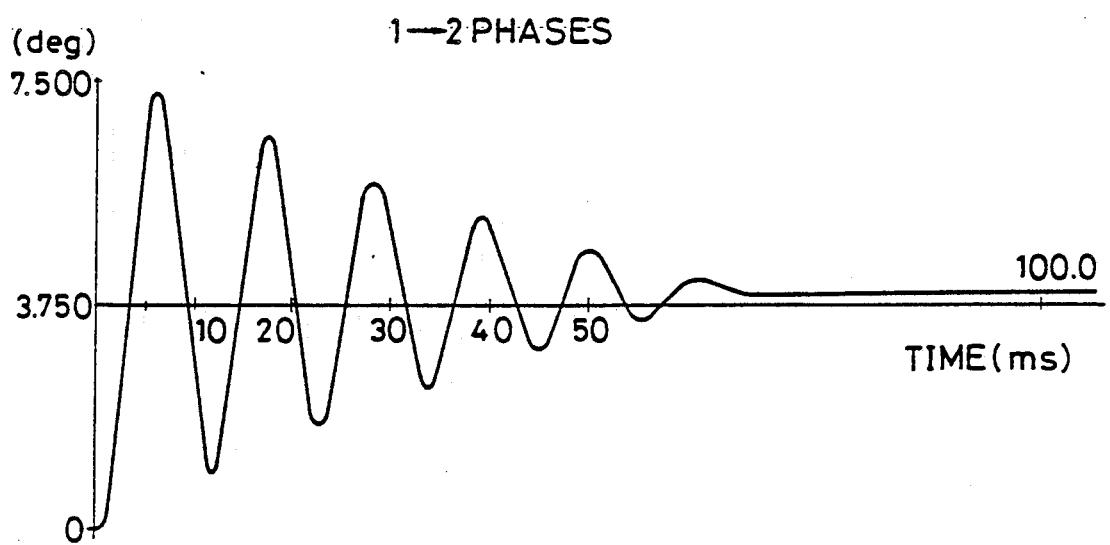
FIG. 1B is a graph showing a step response of a stepping motor upon energization of two phases at 1-2 phase energization drive (half-step drive)
Figure 2:
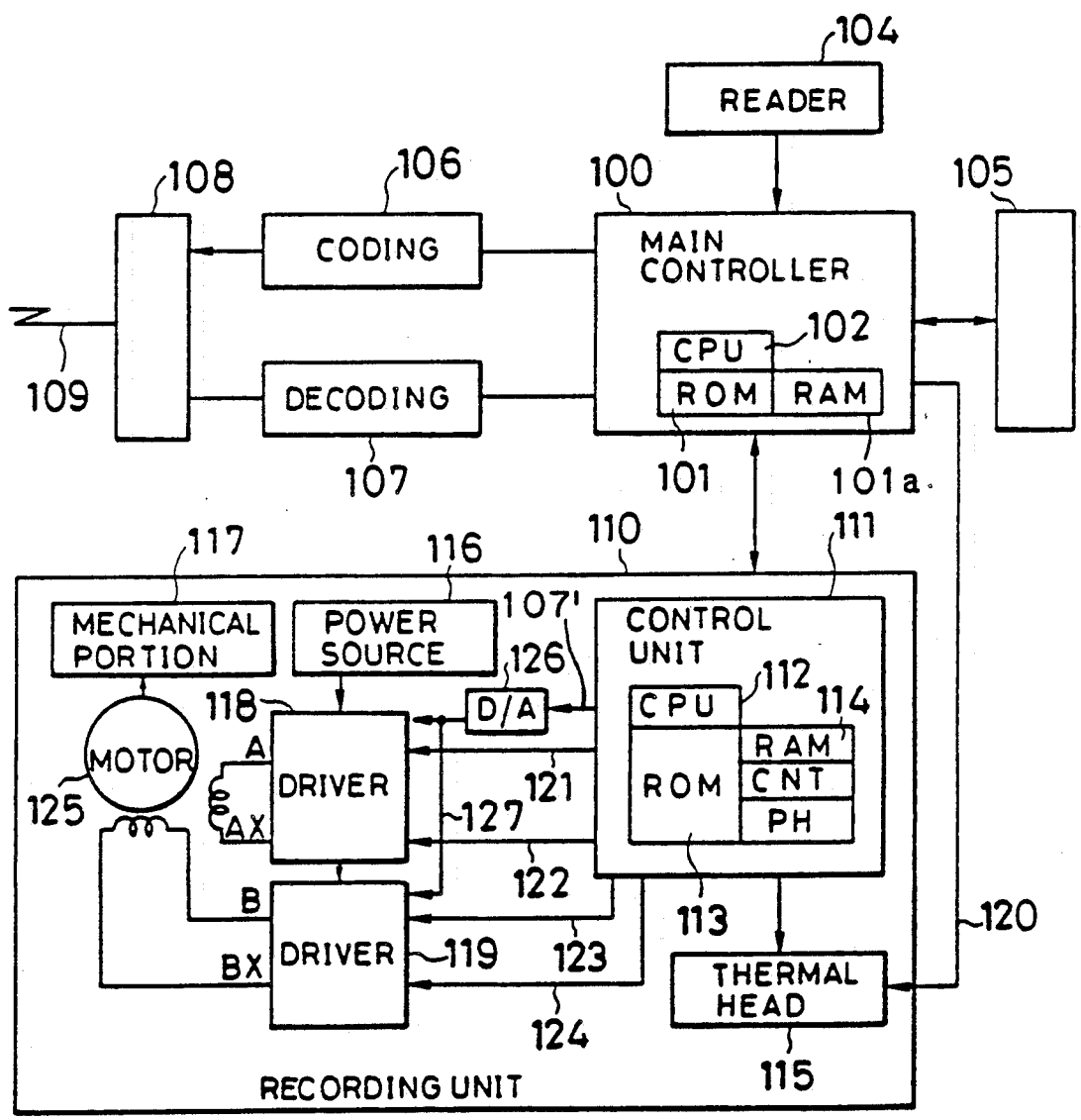
FIG. 2 is a block diagram of a facsimile system incorporating a stepping motor driving system according to a preferred embodiment of the present invention
Figure 5:
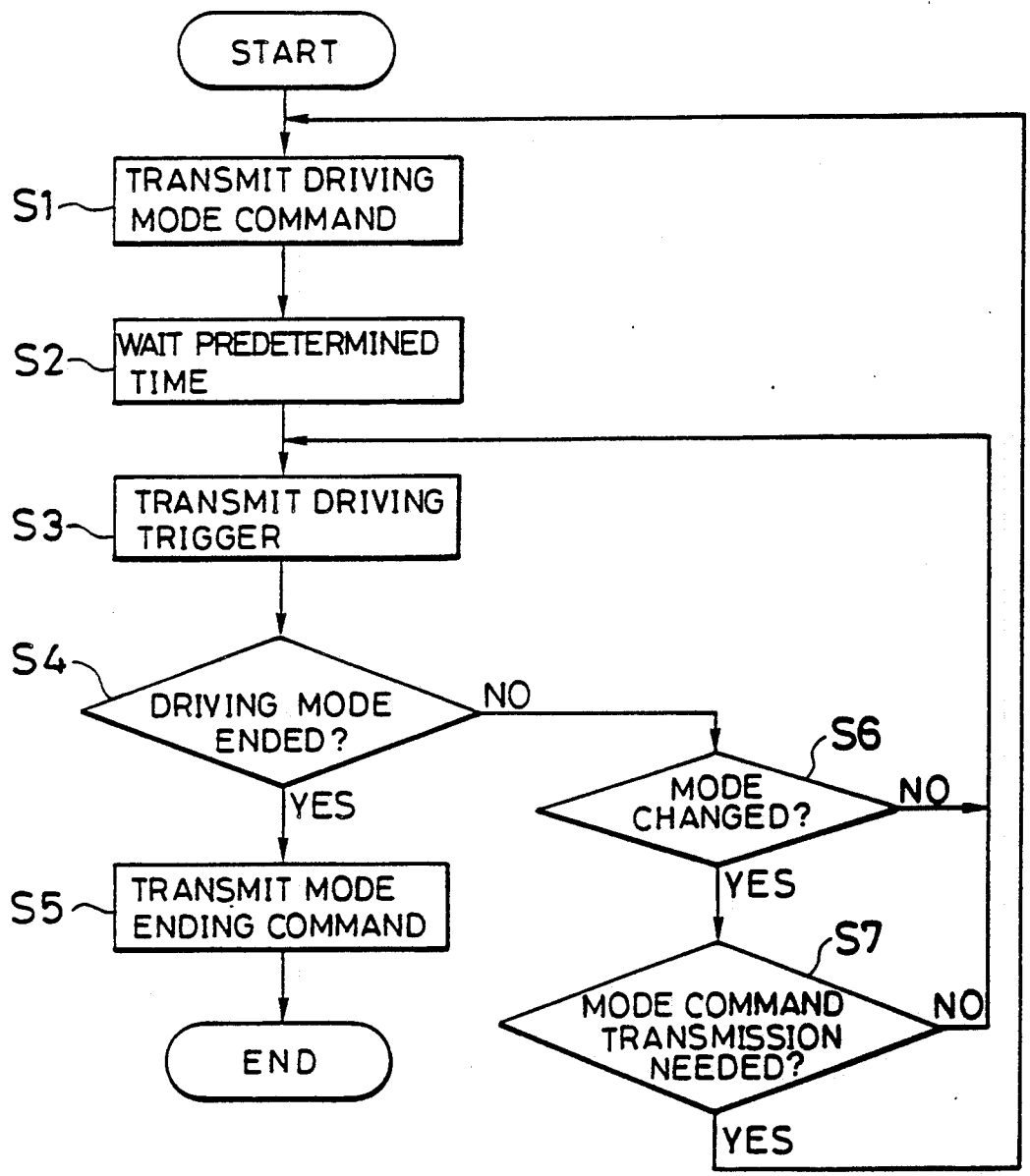
FIG. 5 is an operation flow chart of a main controller of the facsimile system of FIG. 2.

FIG. 2 shows a block diagram of a facsimile system, where a main controller 100 for controlling the whole facsimile system includes a CPU (central processing unit) 102 for performing various controls on the basis of a control program as shown by the flow chart of FIG. 5 and various data stored in a a ROM )read only memory). A RAM (random access memory) 101a is used as a work area for the CPU 102 and temporarily holding various data. The facsimile system further includes a reader 104 for optically reading a original and for inputting the result to the controller 100, an operation unit 105 having an operation panel such as a keyboard for inputting various information by an operator, a liquid-crystal display (not shown) for displaying messages and the like for the operator, a coding portion 106 for coding original image data from the reader portion 104 to, for example, MH codes and the like, a decoding portion 107 for converting received image data into decoded image data, a receiving and transmitting portion 108 for performing reception-transmission control between it and a communication circuit 109 such as a public circuit, and a recording unit 110 for forming an image on the basis of the image data. The recording unit 110 is controlled by a control unit 111 which includes a CPU 112 such as a microprocessor, a ROM 113 for storing a control program for the CPU 112, as shown by a flow chart in FIG. 6, and a RAM 114 which is used as a work area for the CPU 112. The RAM 114 is provided with a counter CNT (described later) and a PH (phase memory) for storing the energization phase. The recording unit 110 further includes a thermal head 115 having a length corresponding to the width of a so-called B-4 size paper. The thermal head 115 has 2048 dots (2048 heating elements) per one line. These 2048 dots are divided into four blocks, each including 512 dots, and its recording operation is effected by supplying the electric current to each block to heat the same.

Incidentally, in the illustrated embodiment, each block is heated and driven for 0.6 ms at a maximum, and the maximum recording time for each line is 2.4 ms.

The recording unit 110 further includes a mechanical portion 117 for feeding recording paper. The mechanical portion 117 has a stepping motor 125 and a driving mechanism for feeding the recording paper, a power source 116 (DC 24V) for actuating the stepping motor 125, and a D/A (digital to analog) converter 126 for receiving digital control signals 107' from the control unit 111 and for outputting driving current and a controlling reference voltage $V_R$ to drivers 118 and 119. The drivers 118 and 119 are both driver circuits for driving the stepping motor. These driver circuits have a construction such as shown in detail in FIG. 3; and each may be constituted by a driver circuit Model 3718(S) sold by Tomson Inc. A signal 121 outputted from the control unit 111 FIG. 2 is a phase signal for controlling a direction of phase current flowing through an A-phase and is used for controlling energization of the A-phase or energization reverse phase (AX) to the A-phase. A signal 122 is a two-bit winding current control signal used for adjusting the energization energy of the A-phase. Similarly, a signal 123 is a phase signal used for controlling a direction of phase current flowing through a B-phase to control energization of the B-phase and energization of reverse phase (BX) to the B-phase, and a signal 124 is a winding current control signal used for adjusting energization energy of the B-phase.

Figure 3:
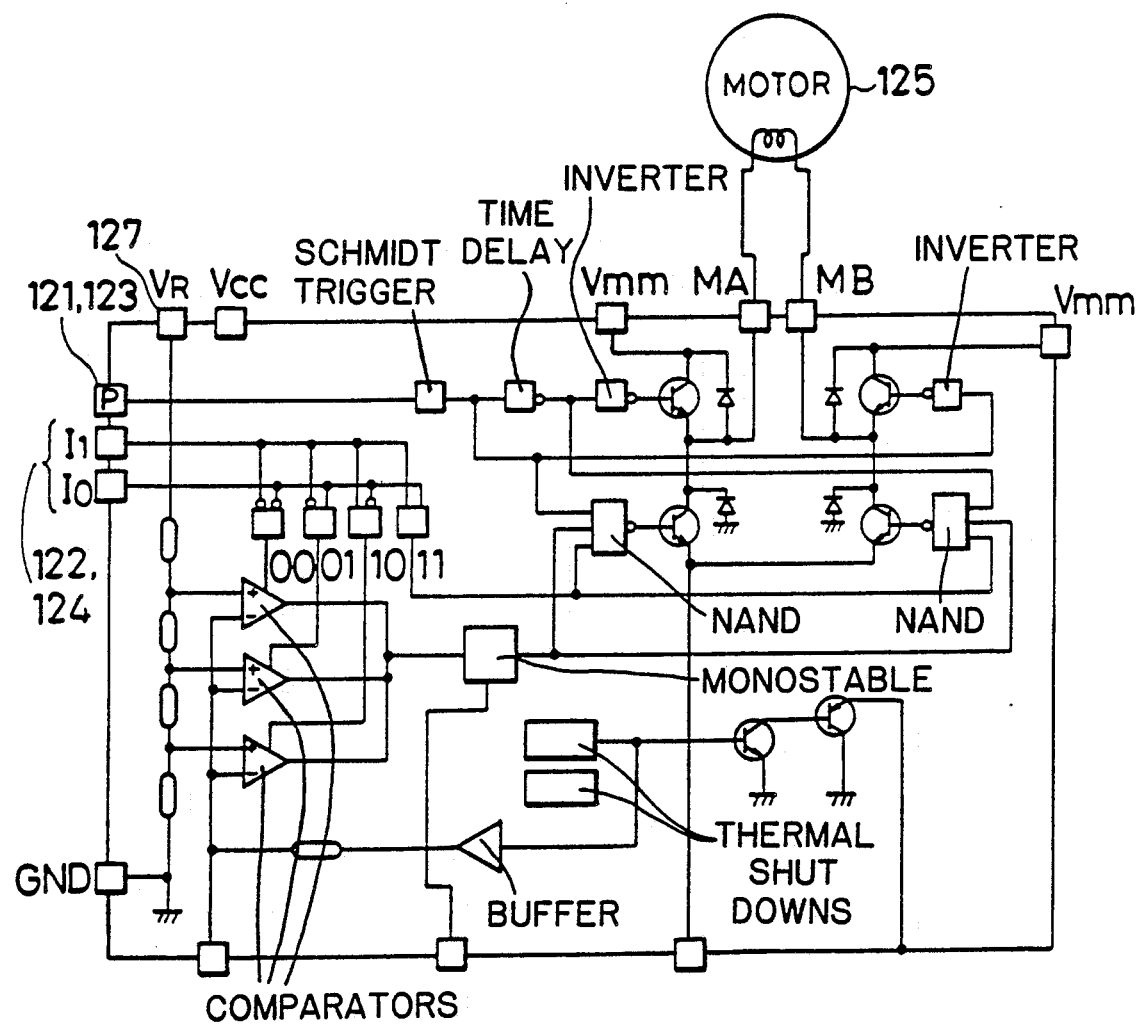
FIG. 3 is a detailed block and circuit diagram of a driver circuit of in the motor driving system FIG. 2.

FIG. 3 is a block diagram showing the construction of the driver of FIG. 2, which is the driver circuit Model 3718(S) sold by Tomson Inc, as mentioned above.

The driver circuit is a bipolar chopper driver circuit wherein a reference voltage terminal $V_R$ (127) thereof receives an output voltage from the D/A converter 126 (FIG. 2) as a reference voltage for determining a value of chopper current. Accordingly, the control unit 111 can alter the energization energy of the motor 125 by controlling the value of the reference voltage by means of the control signal 107'. Further, the driver circuit is designed so that it can adjust the energization energy of the stepping motor 125 by adjusting the driving voltage for the motor 125 at four stages by means of the two-bit control signal 122 or 124. As mentioned above, the signals 121 and 122 are used for determining the direction of the phase current flowing through the motor 125. When a signal with HIGH level is inputted to a terminal P, the current flows from a terminal MA to a terminal MB, whereas when a signal with LOW level is inputted to the terminal P, the current flows from the terminal MB to the terminal MA. A terminal Vmm receives the voltage of 24V from the power source 116.

With the above-described arrangement, when it is desired to receive and record image data, the main controller 100 communicates to the control unit 111 the fact that the driving of the motor is being performed, and transfers the one line image data obtained by decoding the received data to the thermal head 115 and outputs command signals regarding the feeding of the recording paper and the start of the recording to the control unit 111 of the recording unit 110.

Then, the control unit 111 energizes one phase of the motor 125 on the basis of the first driving signal and stores the data of the energized phase in the phase memory PH. When a driving trigger is inputted, the motor 125 is rotated from the phase next to the one in the phase memory PH by the 1-2 phase energization drive (half-step drive).

Next, operation of the stepping motor driving system having the above-mentioned construction will be explained. First of all, the operation of the main controller 100 will be described with reference to a flow chart shown in FIG. 5.

The sequence is started upon reception of the command signal regarding the start of the reading and/or recording of the original or the feeding of the recording paper. First of all, in a step S1, a driving mode command is sent to the control unit 111 in the motor driver circuit. As will be fully explained in FIG. 6, when receiving the driving mode command, the control unit 111 of the recording unit 110 starts to energize the first phase of the motor 125.

Incidentally, it is assumed that, before the driving mode command is inputted, the motor 125 is being de-energized and the position of the rotor of the motor is not being determined. The first phase to be first energized by the driving mode command may be any one of the phases of the motor (in this case, for example, the A-phase is first energized), for the reason that, since this driving mode command is outputted at the initiation of the transmission or reception, even when the rotation angle of the motor 125 is changed by energizing any first phase of the motor by this command, the recording operation and reading operation are not affected by such variation of the rotation angle of the motor.

In a step S2, a predetermined time is waited until the rotor actually reaches a position corresponding to the A-phase. In a step S3, the driving trigger is transmitted to the control unit 111 together with the number of driving steps by which the motor 125 is to be rotated. In this case, since the number of feeding steps of the recording paper performed by each driving trigger is previously determined on the basis of the transmission-reception mode of the facsimile, and/or coding and decoding conditions, in the reading and recording operations, the motor is rotated intermittently by said number of steps. However, when the recording paper or the original is to be fed by a predetermined amount, for example to cut the recording paper, the motor is rotated by the more large number of successive steps.

In a step S4, it is ascertained whether the driving mode is ended or not, i.e., whether the transmission process or reception process is completed or not. If YES, the sequence goes to a step S5, where a mode ending command is transmitted to the control unit 111 to stop the motor. On the other hand, if it is ascertained that the driving mode is not ended in the step S4, the sequence goes to a step S6, where it is ascertained whether the driving mode should be changed or not. If NO, the sequence returns to the step S3, whereas, if YES, the sequence goes to a step S7, where it is ascertained whether a new mode command transmission is needed. This is done for the reason that, for example, in a driving mode of a reading motor in the multi-page transmission operation, although when the density in the auxiliary line of one page is the same as that of any other page, the motor can be rotated from the next phase to the energized phase lastly held for the previous page, so that the new page is read, when, for example, after one page is read with the super fine mode of 15.4 line/mm, the next page should be read with the fine mode of 7.7 line/mm, a new driving mode command must be transmitted to the control unit 111 to always start the driving of the motor from energization of two phases.

Next, a motor driving operation of the control unit 111 will be explained with reference to a flow chart shown in FIG. 6.

The program for carrying out this sequence is stored in the ROM 113.

Figure 4:
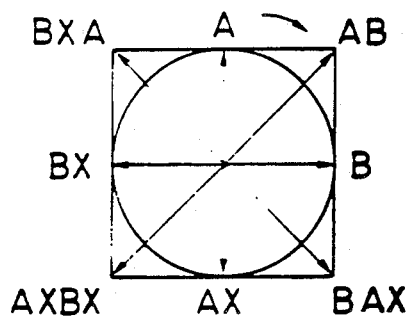
FIG. 4 is a vector diagram showing a torque vector of a stepping motor.

In a step S10, when the data is inputted from the main controller 100, the sequence goes to a step S11, where it is ascertained whether the data is the driving mode command or not. If the data is the driving mode command, then in a step S12, the A-phase of the motor shown in FIG. 4 is energized as a first phase (to be firstly energized) of the stepping motor 125 to be driven, and the data of the energized phase is stored to the phase memory PH. This means that in the 1-2 phase energization drive the holding is effected at energization of one phase, and accordingly, the first energized phase is not always the A-phase.

On the other hand, if it is ascertained that the data is not the driving mode command in the step S11, the sequence goes to a step S13, where it is ascertained whether the data is a driving trigger or not. If a driving trigger has been inputted, the sequence goes to a step S14, where the number (n) of the driving steps included in the driving trigger is read, and the result is stored in the CNT of the counter RAM 114. Then, in a step S15, the phase next to the held phase (being stored in the phase memory PH) held in the step S12 is energized by the 1-2 phase energization drive, and renews or rewrites the phase memory PH. In a step S16, the phase energization time is counted, and, when such time is elapsed, the sequence goes to a step S17, where the contents of the counter CNT is reduced by 1 (CNT=CNT−1). In a step S18, it is ascertained whether the contents of the counter CNT is zero or not. If the counter is not zero, the sequence returns to the step S15, where the next phase is energized. On the other hand, if it is ascertained that the contents of the counter CNT is zero in the step S18, the sequence returns to the step S10 to wait for the next command.

Next, if it is ascertained that the data is not the driving trigger in the step S13, the sequence goes to a step S19, where it is ascertained whether the data is a mode end command or not. If the mode end command is inputted, the sequence goes to a step S20, where the energization is turned to OFF to save the consumption of power. Of course, in place of the energization-OFF, the energization may be powered down, that is to say, the phase energization current may be reduced.

In this way, in the facsimile system, since the density in the auxiliary direction is set to increase or decrease by even (number) times, such as the reference mode, fine mode and super fine mode, when the feeding amount of one line in the super fine mode corresponds to one step angle of the stepping motor 125, in many cases, the motor is rotated by an even number of steps. Thus, by always initiating the energization of the first phase from energization of one phase, the phase being energized at the end of the driving of the motor is always the energization of one phase, and the motor is started with energization of two phases again by the next driving trigger.

Incidentally, in the illustrated embodiment, while an example that the main control and the driving control are performed independently was explained, the main controller recognizing the driving mode may directly control the motor drivers.

Further, in the illustrated embodiment, while an example of a facsimile system was explained, the present invention is not limited to a facsimile system, but may be applied to drive a general stepping motor.

As mentioned above, according to the present invention, by holding the motor at energization of one phase before the initiation of the driving of the motor in the auxiliary scanning of the facsimile system and by always starting the rotation of the motor with energization of two phases, the starting torque of the motor can be increased without increasing the energization current per each phase, thereby reducing the residual vibration of the motor and smoothly driving the motor with the minimum noise.

I claim:

1. A driving system for driving a stepping motor with 1-2 phase energization drive, comprising:
   a stepping motor having a rotor and a plurality of energization coils which are subject to energization of one phase and energization of two phases alternatively and repeatedly;
   a plurality of drivers for applying energization current to said energization coils to drive said coils with said energization of one phase and energization of two phases alternatively and repeatedly; and
   control means for controlling the energization current of said drivers to drive said coils with said energization of one phase and energization of two phases alternatively and repeatedly, said control means affecting the energization current of one phase by a driving mode command and determining a position of said rotor to the one phase and starting energization from two phases next to the one phase where the position of said rotor has been determined by a next driving trigger to effect rotation of the motor.

2. A stepping motor driving system according to claim 1, wherein said control means has a memory means for storing the phase energized with said energization of one phase by said driving mode command, and controls the energization current of said drivers in such a manner that two phases next to said phase stored in said memory means are energized by said driving triggers.

3. A driving system for driving a stepping motor with 1-2 phase energization drive, used with a facsimile system, comprising:
   a stepping motor having a rotor;
   first control means for alternatively and repeatedly driving said stepping motor with energization of one phase and energization of two phases, said first control mean changing said stepping motor from a non-energization condition to a one phase energization condition by applying a first signal to said stepping motor to determine a position of the rotor at said one phase, and starting said energization of two phases from energization of said two phases next to the one phase by applying a second signal to said stepping motor; and
   second control means for generating a driving command so that said first control means outputs said first signal and for generating a driving trigger so that said first control means outputs said second signal.

4. A stepping motor driving system according to claim 3, wherein said driving system is used for a facsimile system, and said first control means comprises a control unit for said stepping motor, and said second control means comprises a main controller for the facsimile system.

* * * * *

UNITED STATES PATENT AND TRADEMARK OFFICE
CERTIFICATE OF CORRECTION

PATENT NO. : 5,001,410

DATED : March 19, 1991

INVENTOR(S) : TAKESHI ONO

It is certified that error appears in the above-identified patent and that said Letters Patent is hereby corrected as shown below:

SHEET 5 OF 5

FIG. 6, "TRIGGR" should read --TRIGGER--.

COLUMN 1

Line 10, "in" should read --in a--.
    Line 39, "systems," should read --systems--.
    Line 42, "reference a" should read --a reference--.
    Line 47, "with" should read --by-- and
            "by the" should read --with--.
    Line 64, "driving." should read --driving system.--.
    Line 65, "niques" should read --nique--.
    Line 67, "the" (first occurrence) should be deleted.

COLUMN 2

Line 11, "to" should read --its--.
    Line 30, "will" should be deleted.
    Line 31, "case" should read --case where--.
    Line 44, "build" should read --to build--.
    Line 45, "start" should read --the start--.
    Line 49, "that arises in" should read --arises in that--.
    Line 58, "object" should read --objects--.

COLUMN 3

Line 3, "invention" should read --invention;--.

UNITED STATES PATENT AND TRADEMARK OFFICE
CERTIFICATE OF CORRECTION

PATENT NO. : 5,001,410
DATED : March 19, 1991
INVENTOR(S) : TAKESHI ONO

It is certified that error appears in the above-identified patent and that said Letters Patent is hereby corrected as shown below:

COLUMN 3

Line 5, "of in the motor driving system" should read --in the motor driving system of--.
Line 23, ")read" should read --(read--.
Line 24, "ory)." should read --ory) 101.--.
Line 25, "temporarily" should read --for temporarily--.
Line 27, "a" should read --an--.

COLUMN 4

Line 19, "Inc," should read --Inc.,--.

COLUMN 5

Line 67, "firstly" should read --first--.

COLUMN 6

Line 12, "CNT of the counter RAM" should read --counter CNT of the RAM--.
Line 19, "is" should read --are--.
Line 21, "counter is" should read --contents are--.
Line 24, "is" should read --are--.

UNITED STATES PATENT AND TRADEMARK OFFICE
CERTIFICATE OF CORRECTION

PATENT NO. : 5,001,410
DATED : March 19, 1991
INVENTOR(S) : TAKESHI ONO

Page 3 of 3

It is certified that error appears in the above-identified patent and that said Letters Patent is hereby corrected as shown below:

COLUMN 8

Line 2, "gers." should read --ger.--.
Line 10, "mean" should read --means--.

Signed and Sealed this

First Day of December, 1992

Attest:

DOUGLAS B. COMER

Attesting Officer

Acting Commissioner of Patents and Trademarks